Aug. 14, 1956 R. PYZEL 2,758,828
PROCESS FOR MANUFACTURING HYDRAULIC CEMENT IN ROTARY KILNS
Filed April 7, 1954
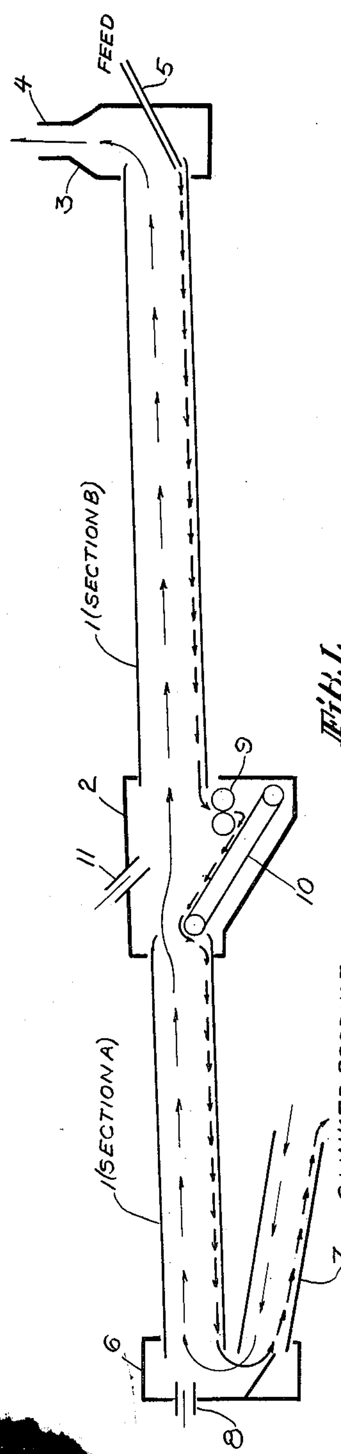
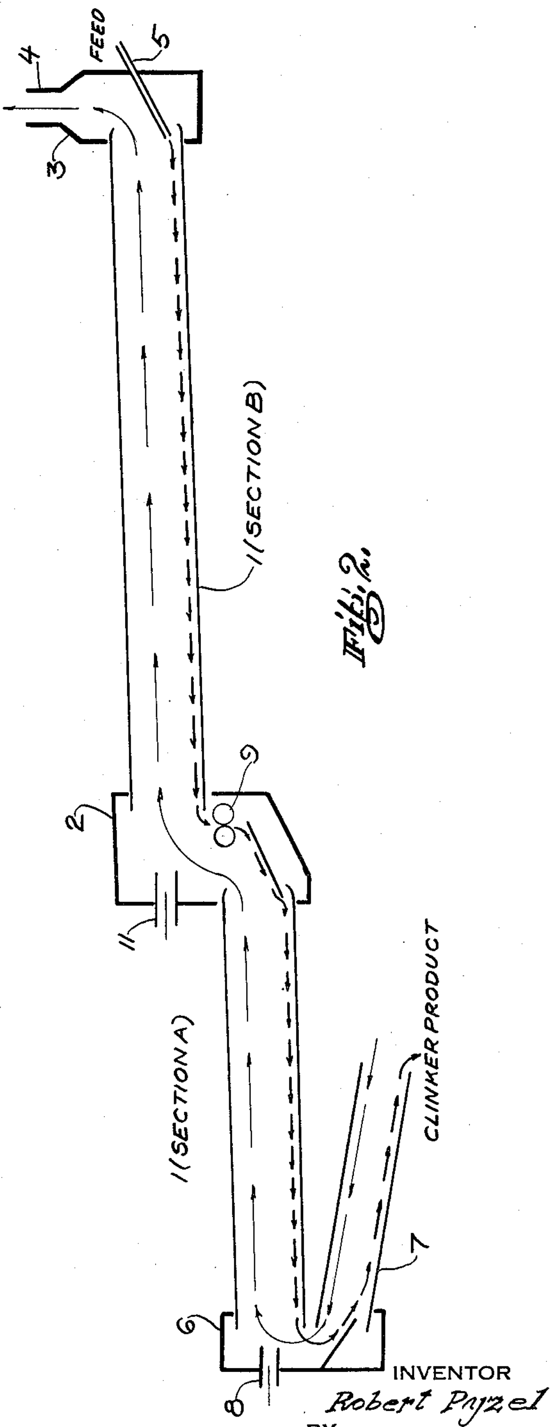
INVENTOR
Robert Pyzel
BY
Moses, Nolte, Crews + Berry
ATTORNEY United States Patent Office 2,758,828 Patented Aug. 14, 1956

2,758,828

PROCESS FOR MANUFACTURING HYDRAULIC CEMENT IN ROTARY KILNS

Robert Pyzel, Piedmont, Calif.

Application April 7, 1954, Serial No. 421,582

2 Claims. (Cl. 263—53)

My invention relates to improvements in the art of manufacturing hydraulic cements in rotary kilns. Among the particular objectives of my invention are (1) to obtain a better fuel economy in the kiln's operation and (2) to increase the kiln's production capacity.

Hydraulic cements are manufactured from raw materials containing calcium carbonate and compounds of silica, alumina, iron oxide, and the like. To convert these materials into hydraulic cement requires that the calcium carbonate is converted to calcium oxide by calcining to drive off carbon dioxide, and that thereafter the calcium oxide is reacted with the silica, alumina and iron oxide materials to form compounds consisting of combinations such as di-calcium-silicate, tri-calcium-silicate, tri-calcium-aluminate and tetra-calcium-alumino-ferrite. The latter reactions are generally referred to as "clinkering," and thus there are two principal reactions occurring in the operation of the kiln, namely, calcination of the carbonates followed by clinkering of the oxides.

In the present rotary kiln operation the raw materials are charged into the stack end of the kiln in powdered form, either as dry powder or as a slurry of the powder in water. As the materials travel through the kiln toward the burner end from which the clinker product is discharged, the following sequence of steps takes place as the temperature of the materials being processed increases from about 200° F. to about 2500° F.

1. Removal of free water.
2. Removal of combined water and organic matter.
3. Calcining to remove $CO_2$ from the carbonates.
4. Clinkering of the oxides.

In the actual operation of the rotary kiln these steps do not occur distinctly but overlap, and particularly the third and fourth steps overlap in a serious and detrimental fashion which is the cause for the inefficiency and low capacity of the rotary kiln process as presently practiced. The effect is that the calcining zone inadvertently extends far into what should be the clinkering zone, thereby reducing the capacity and efficiency of the latter to the disadvantage of the entire operation.

My invention specifically aims to reduce or eliminate the overlapping of the calcining zone into the clinkering zone. In order to set forth my invention it is necessary to describe first the conditions occurring in the kiln which cause the excessive overlapping of the calcining zone in the present operation of the kiln.

Simply stated, the essence of the problem is that at a point in the kiln where the calcination is only partially completed, the materials being processed are rolled into large pebbles, and from this point on it becomes difficult to drive the necessary heat into the interior of these pebbles to complete the calcination of the remaining carbonates. These remaining carbonates become "shielded," as it were, against effective heat input.

It should be borne in mind that the calcination reaction is highly endothermic, so that a great deal of heat must flow into the interior of the pebbles in order to effect complete calcination. In addition, when reaction does take place inside the pebbles, carbon dioxide gas is generated and the pores of the pebbles rapidly become filled with the escaping gas. Thus the unconverted carbonates in the interior of the pebbles are surrounded by a 100% $CO_2$ atmosphere and probably at increased pressures, and this tends to depress the reaction velocities and demands higher temperatures to completely calcine all the "shielded" carbonates. Consequently, some carbonates will persist far into the clinkering zone. Even though the amount of these persisting carbonates may be comparatively small, for instance less than 10 percent of the carbonates charged to the process, the detrimental effect on the operation of the clinkering zone is disproportionately large. This is so because the most difficult reaction involved in clinkering is the final combination of calcium oxide with di-calcium-silicate to form tri-calcium-silicate.

The final tri-calcium-silicate forming reaction requires the highest temperatures and relatively long reaction time factors, and it obviously cannot be completed until all the calcium carbonates have been converted to calcium oxide. Thus the persistence of unconverted carbonates defers this final phase of the clinkering reaction until only a short length of the kiln (at the burner end) remains in which to accomplish it, and the capacity of the kiln to produce a clinker product which is essentially free of unreacted calcium oxide is thus greatly reduced. At the same time, the kiln must be fired to obtain the necessary high temperature level in the clinkering section, and, therefore, the fuel burning rate is high compared to clinker producing capacity, resulting in a high fuel consumption per unit of product.

The formation of large pebbles in the calcining section of the kiln is probably due to a combination of two conditions prevailing in this section—(1) the tendency of any horizontal rotating drum to roll powder into pebbles if the powder is slightly sticky, and (2) the development of a slight stickiness which has been observed to occur at low temperatures (much below the final clinkering temperature) as a result of initial reactions between calcium oxide, silica and alumina, forming di-calcium-silicate and mono-calcium-aluminum. (Iron oxide may also be involved in these lower temperature initial oxide reactions, but this has not been thoroughly investigated.) It should be noted that only a part of the carbonates need be converted in order to provide the calcium oxide necessary for reacting all of the alumina and silica into mono-calcium-aluminate and di-calcium-silicate. From this point on, additional calcium oxide will react with these two materials to convert them into tri-calcium-aluminate and tri-calcium-silicate, and this constitutes the final phase of the clinkering reaction occurring at high temperatures.

In order to improve the overall operation of the kiln, it is necessary to break up the large pebbles which are formed in the calcining section of the kiln, so that the final calcination may be accomplished with the materials in the shape of small particles or pieces which do not present the heat penetrating problems above referred to. As a result the calcination is completed more rapidly and more effectively, and the excessive overlapping of the final calcination into the high temperature clinkering zone is prevented. The capacity of the clinkering zone is thereby greatly increased, and the heat liberated by combustion in the kiln is more efficiently utilized. The overall result is an increased capacity at lower fuel consumption per unit of clinker product.

The pebbles which are formed in the calcining section may be broken up by interposing, at a suitable point in the length of the kiln, crushing equipment through which the materials being processed must pass on their way to the final calcination and the clinkering zones. The exact place in the kiln's length at which such equipment is interposed has considerable latitude, for the following reason:

The finely powdered feed materials will be rolled into pebbles due to a slight stickiness. When these pebbles are broken up into smaller pieces, the slight stickiness is not sufficient to again cause these pieces to be rolled into larger pebbles. These pieces, though small, are very much larger than the original powder particles, and a much greater stickiness would be required to cause them to stick together in large aggregates. Pebbles will be formed over a considerable length of the kiln, and the crushing equipment may be interposed anywhere within the pebble forming length. Once the powdered feed materials have been formed into pebbles and these pebbles are broken up into small pieces, a further build-up of large pebbles is prevented from this point on.

The operation of my invention may be further described with reference to the accompanying drawing, Figures 1 and 2 of which diagrammatically illustrate apparatus suitable for carrying out my process. The particular items of equipment illustrated constitute preferred forms suitable for the purpose but are not intended as a limitation upon the full scope of my invention.

Referring to Figure 1, rotary kiln 1 is divided into sections A and B which are joined by a pebble crushing chamber 2. The two sections of the kiln are supported at a slight angle from the horizontal and are placed in a straight line continuation of one another.

The upper end of section B extends into an exhaust gas chamber 3, from which the exhaust gases flow through stack 4 to the atmosphere or to other typical equipment (not shown) such as dust collectors, waste heat boilers, etc. Feed materials are charged into the upper end of section B through pipe 5.

The lower end of section A extends into chamber 6. A clinker cooler 7 also extends into chamber 6. The main burner 8 is fitted into chamber 6.

The upper end of section A and the lower end of section B extend into pebble crushing chamber 2. Sections A and B, and clinker cooler 7, are supported on rollers and are provided with girth gear devices to effect a slow rotation. These typical items are not shown on the drawing.

Pebble crushing chamber 2 contains crushing equipment 9 and an elevator 10 which carries the crushed materials into the upper end of section A. An auxiliary burner 11 is fitted into pebble crushing chamber 2.

In the operation of this equipment, the feed materials which are charged into the upper end (stack end) of section B, travel through this section and are heated to temperatures in the order of 1400° F. As a consequence, steps 1 and 2, and part of step 3 above mentioned, are carried out and the materials being processed are partially calcined and rolled into pebbles in section B, and are in this condition discharged from this section into the crushing equipment in chamber 2.

The crushing equipment may consist, for instance, of two parallel cylinders, spaced slightly apart, and rotating so that the materials are forced down between the cylinders. The driving mechanism (not shown) which rotates the cylinders may be so arranged that one cylinder revolves somewhat faster than the other, to obtain a scouring action as well as a crushing action. The surfaces of the cylinders may be smooth or provided with ridges designed to obtain the most satisfactory crushing and non-fouling operation. Other types of crushing equipment may be employed—there are many alternative crushing devices which may be suitable for this purpose.

The crushed materials passing between the cylinders fall onto elevator 10, which may consist, for instance, of an endless chain belt, and are carried into section A. As the crushed materials travel through section A, and are heated to temperatures in the order of 2500° F., final calcination and clinkering takes place, completing steps 3 and 4 above mentioned.

The clinkered materials fall from the lower end (burner end) of section A into clinker cooler 7 from which they are discharged as shown. Secondary air flows through clinker cooler 7 in counter-current to the clinkered materials, thereby effecting an exchange of heat between incoming air and discharging clinker.

The heat necessary for the operation is mainly generated by burner 8, through which fuel and primary air are supplied. The combustion gases travel through section A, crushing chamber 2 and section B, that is, in counter-current to the materials being processed, and are discharged through stack A. Additional fuel and air may be charged through burner 11, in order to control the extent of the partial calcination taking place in section B.

Referring now to Figure 2, the operation is essentially identical to that described with reference to Figure 1; the similar parts have been given prime numerals. The difference between the operation shown on Figure 1 and on Figure 2 resides in that, in the case of Figure 2, the elevator has been eliminated, which is made possible by raising section B relative to section A so that the crushed materials will flow by gravity into the upper end of section A. Item 10 (the elevator) is, therefore, absent in Figure 2.

The arrangement shown in Figure 2 may be preferable when my invention is embodied in newly installed plants, while the arrangement shown in Figure 1 may be more convenient when my invention is applied to already existing kilns.

I have described what I believe to be the best embodiments of my invention. I do not wish, however, to be confined to the embodiments shown, but what I desire to cover by Letters Patent is set forth in the appended claims.

I claim:

1. A process for the manufacture of hydraulic cement which comprises charging carbonates containing cement-forming raw materials in powdered form into a first calcining zone through which said materials travel in counter-current to combustion gases flowing through said zone, partially calcining said carbonates in said zone under conditions which cause an agglomeration of the powdered materials traveling therethrough into aggregates, discharging said aggregates from said zone and crushing said aggregates, charging said crushed aggregates into a second calcining zone through which said crushed aggregates travel in counter-current to combustion gases flowing through said second zone to complete the calcination of said carbonates and react the materials into cement clinker, discharging said cement clinker from said second zone.

2. A process for the manufacture of hydraulic cement as set forth in claim 1 in which the aggregates from the first calcining zone are crushed while maintained at substantially the temperature of the calcining operation.

References Cited in the file of this patent

UNITED STATES PATENTS

| | | |
|---|---|---|
| 1,001,582 | Ellis | Aug. 22, 1911 |
| 2,410,235 | Reaney | Oct. 29, 1946 |